(12) United States Patent
Shimura et al.

(10) Patent No.: US 11,644,418 B2
(45) Date of Patent: May 9, 2023

(54) FAR-INFRARED LIGHT SOURCE AND FAR-INFRARED SPECTROMETER

(71) Applicant: Hitachi High-Tech Corporation, Tokyo (JP)

(72) Inventors: Kei Shimura, Tokyo (JP); Mizuki Mohara, Tokyo (JP); Kenji Aiko, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 0 days.

(21) Appl. No.: 17/409,122

(22) Filed: Aug. 23, 2021

(65) Prior Publication Data
US 2021/0381965 A1    Dec. 9, 2021

Related U.S. Application Data

(63) Continuation of application No. 16/765,238, filed as application No. PCT/JP2017/044695 on Dec. 13, 2017, now abandoned.

(51) Int. Cl.
*G01N 21/3581*     (2014.01)

(52) U.S. Cl.
CPC ... *G01N 21/3581* (2013.01); *G01N 2201/064* (2013.01); *G01N 2201/0633* (2013.01);
(Continued)

(58) Field of Classification Search
CPC .. G01J 3/108; G01J 3/0205; G01J 3/32; G01J 3/0289; G01J 3/0208; G01J 3/0237;
(Continued)

(56) References Cited

U.S. PATENT DOCUMENTS

| 9,835,494 B2 | 12/2017 | Shiramizu |
| 10,948,347 B2 | 3/2021 | Shimura |

(Continued)

FOREIGN PATENT DOCUMENTS

| JP | 5-93931 A | 4/1993 |
| JP | 2002-72269 A | 3/2002 |

(Continued)

OTHER PUBLICATIONS

International Search Report (PCT/ISA/210) issued in PCT Application No. PCT/JP2017/044695 dated Mar. 20, 2018 with English translation (five pages).

(Continued)

*Primary Examiner* — Haa Q Pham
(74) *Attorney, Agent, or Firm* — Crowell & Moring LLP

(57) ABSTRACT

The present invention provides a far-infrared light source capable of reducing the shift in the location irradiated with far-infrared light even when the frequency of the far-infrared light changes. A far-infrared light source according to the present invention is configured so that the variation in the emission angle of far-infrared light in a nonlinear optical crystal when the frequency of the far-infrared light changes is substantially offset by the variation in the refractive angle of the far-infrared light at the interface between the nonlinear optical crystal and a prism when the frequency of the far-infrared light changes (see FIG. 8).

15 Claims, 9 Drawing Sheets

(52) U.S. Cl.
CPC ............ *G01N 2201/0636* (2013.01); *G01N 2201/0638* (2013.01); *G01N 2201/06113* (2013.01)

(58) Field of Classification Search
CPC ...... G01J 3/0224; G01J 3/0264; G01J 3/0291; G01J 3/42; G01J 2003/421; G01J 3/0202; G01N 21/3581; G01N 2201/06113; G01N 2201/064; G01N 2201/0636; G01N 2201/0638; G01N 2201/0633; G01F 1/35; G01F 1/37; G01F 1/39
USPC ............................ 356/51, 300–326; 250/330
See application file for complete search history.

(56) References Cited

U.S. PATENT DOCUMENTS

| | | | |
|---|---|---|---|
| 11,016,023 B1 | 5/2021 | Mohara | |
| 2002/0024718 A1* | 2/2002 | Kawase | G02F 1/39 359/330 |
| 2003/0227668 A1 | 12/2003 | Imai | |
| 2004/0061055 A1 | 4/2004 | Kawase | |
| 2007/0160093 A1 | 7/2007 | Nishizawa | |
| 2010/0213375 A1 | 8/2010 | Loeffler et al. | |
| 2011/0037001 A1 | 2/2011 | Maki | |
| 2011/0272579 A1 | 11/2011 | Itsuji | |
| 2016/0299064 A1 | 10/2016 | Shimura | |
| 2018/0031469 A1 | 2/2018 | Aiko | |
| 2018/0209848 A1 | 7/2018 | Shimura et al. | |

FOREIGN PATENT DOCUMENTS

| | | |
|---|---|---|
| JP | 2010-190887 A | 9/2010 |
| WO | WO 2017/013759 A1 | 1/2017 |

OTHER PUBLICATIONS

Japanese-language Written Opinion (PCT/ISA/237) issued in PCT Application No. PCT/JP2017/044695 dated Mar. 20, 2018 (four pages).

Murate et al., "Expansion of the tuning range of injection-seeded terahertz-wave parametric generator up to 5 THz", Applied Physics Express, 2016, pp. 082401-1-082401-3, vol. 9 (three pages).

Japanese-language Office Action issued in Japanese Application No. 2019-559460 dated Mar. 16, 2021 (four (4) pages).

* cited by examiner

FAR-INFRARED LIGHT SOURCE AND FAR-INFRARED SPECTROMETER

CROSS REFERENCE TO RELATED APPLICATIONS

This application is a continuation of U.S. patent application Ser. No. 16/765,238, filed May 19, 2020, which is a 371 of International Application No. PCT/JP2017/044695, filed Dec. 13, 2017, the disclosures of which are expressly incorporated by reference herein.

TECHNICAL FIELD

The present invention relates to a far-infrared light source.

BACKGROUND ART

Electromagnetic wave in a far-infrared region of wavelengths approximately ranging from 25 μm to 4 mm is also called terahertz wave which combines features of penetrating property of electric wave and rectilinearity of light. An absorption spectrum in the far-infrared region has peaks specific to many substances and hence, the electromagnetic wave in the far-infrared region is expected to be effectively used for identification of substances. Heretofore, however, no compact, convenient light source for emission in this wavelength region has been available. Further, a detector was also hard to use because of the necessity of cooling with liquid helium. Accordingly, the electromagnetic wave in the far-infrared region has been used in only a limited research application.

In the 1990's, a light source and detector employing a femtosecond laser, which is small and does not require cooling, have been put to practical use. At present, general-purpose spectrometry systems based on time domain spectroscopy have been commercially available. Research and development for applications in various fields such as security, biosensing, medical care/pharmaceutical technology, industries and agriculture are being conducted. Quantitative analysis of components is required for the implementation of such industrial applications.

The following patent literature 1 describes about the far-infrared light source. This literature discloses the following technique where a far-infrared spectrometer includes: a wave-length variable far-infrared light source for emitting a first far-infrared light; an illumination optical system for illuminating a sample with the first far-infrared light; a nonlinear optical crystal for detection which converts a second far-infrared light from the sample to a near-infrared light by means of a pump light; and a far-infrared light imaging optical system for forming an image of the sample at the nonlinear optical crystal for detection, and where an irradiation position of the first far-infrared light on the sample is independent of the wavelength of the first far-infrared light (see the abstract herein).

In the quantitative analysis using the time domain spectroscopy, it is difficult to obtain high output in a 1 to 3 THz bandwidth effective for the detection of hydrogen bond or molecular network. Therefore, the quantitative analysis has been faced with many problems such as difficulty in taking measurement through a shielding material such as paper or packing material and difficulty in taking measurement of powder sample intensively scattering light. On the other hand, a method using a frequency tunable coherent light source easily provides high output in the 1 to 3 THz bandwidth and is also effective for analysis through the shielding material or for the analysis of powder sample. More recently, a method expanding the bandwidth up to 5 THz has been also reported (Non-patent literature 1).

CITATION LIST

Patent Literature

Patent Literature 1: WO2017/013759A1
Non-Patent Literature 1: Kosuke Murate et. Al., "Expansion of the tuning range of injection-seeded terahertz-wave parametric generator up to 5 THz", Appl. Phys. Express 9,082401 (2016)

SUMMARY OF INVENTION

Technical Problem

In the method of the patent literature 1, an emission direction of the far-infrared light changes in conjunction with the change in the frequency of the far-infrared light. This results in the change of location irradiated with the far-infrared light on the sample and decrease in the accuracy of quantitative analysis. Particularly, in a case where the bandwidth of the far-infrared light is expanded to perform measurement in a 1 to 5 THz range, the emission direction of the far-infrared light significantly changes, making it difficult to properly configure the optical system.

In the light of the above-described problems, the invention has an object to provide a far-infrared light source adapted to reduce shift in the location irradiated with the far-infrared light even when the frequency of the far-infrared light is changed.

Solution to Problem

The far-infrared light source of the invention is configured such that the variation in the emission angle of the far-infrared light in the nonlinear optical crystal in conjunction with the change in the frequency of far-infrared light is substantially compensated by the variation in the refractive angle of the far-infrared light at the interface between the nonlinear optical crystal and a prism in conjunction with the change in the frequency of the far-infrared light.

Advantageous Effects of Invention

The far-infrared light source according to the invention is adapted to reduce the shift in the irradiation position of the far-infrared light despite the change in the frequency of the far-infrared light. Thus, the far-infrared light source of the invention enables broadband spectroscopic measurement. The problems, components and effects other than the above will become apparent from the following description of the embodiments hereof.

DESCRIPTION OF EMBODIMENTS

First Embodiment: Equipment Configuration

Figure 1:
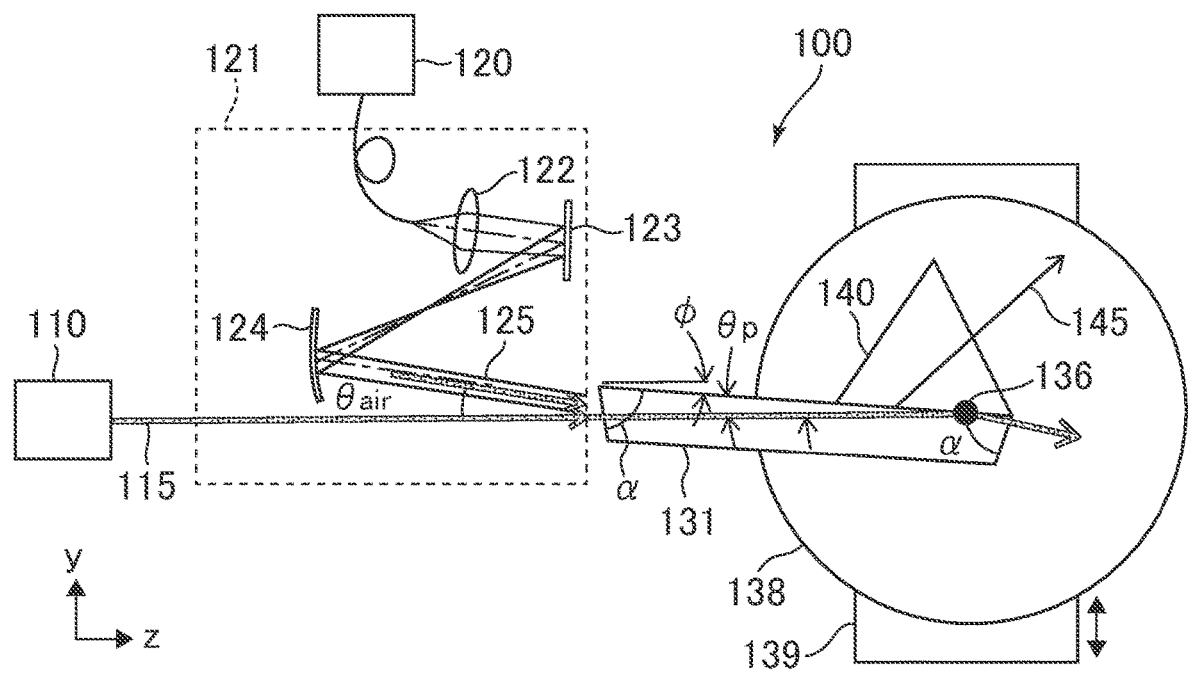
FIG. 1 is a configuration diagram showing a far-infrared light source 100 according to a first embodiment of the invention.

FIG. 1 is a configuration diagram of a far-infrared light source 100 according to a first embodiment of the invention. The far-infrared light source 100 includes: a light source 110, a light source 120, an optical system 121, a nonlinear optical crystal 131, a Si prism 140, a rotary stage 138 and a linear stage 139.

The light source 110 emits a pump light 115. The pump light 115 is incident on a nonlinear optical crystal 131. The light source 110 can be employed, for example, a short pulse Q-switch YAG laser. The light source 120 emits a seed light 125. The seed light 125 is incident on the nonlinear optical crystal 131 via the optical system 121. The light source 120 can be employed, for example, a wavelength tunable semiconductor laser.

The optical system 121 includes: a lens 122, a light deflector 123 and an imaging optical element 124. The seed light 125 is so guided by an optical fiber as to be illuminated onto the lens 122. Passing through the lens 122 and the light deflector 123, the seed light forms a beam waist in vicinity of a front focal plane of the imaging optical element 124. In this configuration, the seed light 125 through the imaging optical element 124 is incident on the nonlinear optical crystal 131 as a beam having a long Rayleigh length (namely, beam in almost collimated state).

The imaging optical element 124 is configured to image the seed light 125 deflected by the light deflector 123 on an entering surface of the nonlinear optical crystal 131. When the light deflector 123 deflects the seed light 125, therefore, an incident position with respect to the entering surface of the nonlinear optical crystal 131 does not change but only an incidence angle changes.

The light deflector 123 may be employed a reflection light deflector such as Galvano-mirror and MEMS mirror or a transmission light deflector. Namely, the light deflector 123 can be employed in any type that can control the angle of the seed light 125.

The imaging optical element 124 can be employed, for example, a concave mirror. Any other optical element (such as lens) is also usable if such an element is capable of imaging the light deflected by the light deflector 123 on the entering surface of the nonlinear optical crystal 131. In a case where the reflection light deflector such as Galvano-mirror is used as the light deflector 123 and the concave mirror is used as the imaging optical element 124, the optical system 121 can be made compact because an optical path is folded in this configuration.

In a case where the optical system 121 is linearly mounted, a transmission light deflector may be used as the light deflector 123 and a lens may be used as the imaging optical element 124. In some implementation constraint, either one of the light deflector 123 and the imaging optical element 124 may be constituted by a reflection optical element and the other may be constituted by a transmission optical element.

The nonlinear optical crystal 131 may be employed, for example, a rod of $MgO:LiNbO_3$ crystal (LN crystal) having a length of about 50 mm. The nonlinear optical crystal 131 is mounted on a stage constituted by the rotary stage 138 and the linear stage 139. By adjusting the angle of the nonlinear optical crystal 131, the rotary stage 138 angularly tilts the nonlinear optical crystal 131 so as to allow the pump light 115 to form a predetermined angle $\theta_p$ to a side plane of the nonlinear optical crystal 131. The linear stage 139 adjusts a y-position of the nonlinear optical crystal 131 (FIG. 1 is accompanied by a coordinate system) so that the pump light 115 may be reflected by the side plane of the nonlinear optical crystal 131 at a location 136 slightly shifted toward the entering side from an exiting surface of the nonlinear optical crystal 131. The rotary stage 138 and the linear stage 139 may be employed in a suitable mechanism that can implement such a function.

The Si prism 140 is attached to a side wall of the nonlinear optical crystal 131. The Si prism is capable of reducing the reflection of far-infrared light from the side plane of the nonlinear optical crystal 131 and efficiently extracting the far-infrared light from the nonlinear optical crystal 131. The Si prism 140 and the nonlinear optical crystal 131 are so configured as to allow the far-infrared light to enter substantially at right angles to the exiting surface of the Si prism 140. This configuration is adapted to reduce variation in the emission direction of the far-infrared light when the wavelength of the far-infrared light is changed.

In a case where the nonlinear optical crystal 131 is tilted at φ=1 to 10° with respect to the pump light 115, it is important to configure the nonlinear optical crystal such that the entering surface and the exiting surface of the nonlinear optical crystal 131 is tilted at an angle α (approximately 80 to 89°) with respect to the side plane thereof. In the case of α=90°, on the other hand, the pump light 115 is specularly reflected by the entering surface or exiting surface of the nonlinear optical crystal 131 and incident on an optical system of the seed light 125. This may result in the destruction of the light source 120. Even though an antireflection coating is applied to the entering surface of the nonlinear optical crystal 131, the pump light 115 is so powerful that a reflected light thereof can have sufficient power for damaging the optical system of the seed light 125. It is effective to insert an optical isolator in the optical system 121 so as to attenuate return light. However, this approach is feasible only in cases where the cost of the isolator is acceptable or there are more than enough mounting spaces.

The above-described configuration is capable of extracting a strong far-infrared light even from a high frequency range of 3 THz or more for the following reason. A far-infrared light generated due to parametric generation is absorbed by the nonlinear optical crystal 131 particularly in the high frequency range of 3 THz or more. However, by putting the pump light close to the side plane of the nonlinear optic crystal 131, the far-infrared light can be extracted while the generated far-infrared light is not attenuated so much by absorption.

First Embodiment: Principle of Far-Infrared Light Generation

The far-infrared light can be generated in conjunction with difference frequency generation or parametric generation which is induced by making two laser beams of different wavelengths (pump light 115 and seed light 125) incident on the nonlinear optical crystal 131 at predetermined angles. The first embodiment provides an example where a LN crystal was used as the nonlinear optical crystal 131, and the far-infrared light was generated by means of parametric generation. A wavelength of the seed light 125, and an angle θ between the seed light 125 and the pump light 115 were so set as to satisfy the following equation 1 and equation 2.

The wavelength ($\omega_T$) of the far-infrared light 145 generated in the nonlinear optical crystal 131 can be calculated on the basis of principle of energy conservation by applying the frequency $\omega_p$ of the pump light 115 and the frequency $\omega_S$ of the seed light 125 to the following equation 1, where ω denotes angular frequency.

[Equation 1]
$$\omega_T = \omega_p - \omega_s$$

Figure 2:
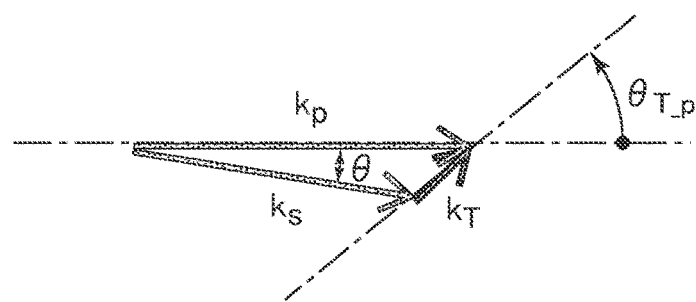
FIG. 2 is a vector diagram showing a relation of far-infrared light 145, seed light 125 and pump light 115.

FIG. 2 is a vector diagram showing a relation of the far-infrared light 145, the seed light 125 and the pump light 115. The generation efficiency of the far-infrared light 145 increases in a case where the momentum conservation low holds. Specifically, a high generation efficiency can be obtained when the following relational equation 2 (phase matching condition) is established among the emission direction of far-infrared light 145/the direction of pump light 115/the direction of seed light 125. In the equation, $k_T$, $k_P$, $k_S$ denotes a wavenumber vector of the far-infrared light 145, the pump light 115 and the seed light 125, respectively.

[Equation 2]
$$k_p = k_s + k_T \qquad (2)$$

The far-infrared light can be generated with high efficiency by setting the wavelength and the incident direction (θ) of the seed light 125 so as to satisfy the above conditions. The following description is made on a configuration which is adapted to suppress the change in the emission direction of the far-infrared light 145 irrespective of the change in the frequency of the far-infrared light 145, when the above-described conditions are satisfied.

First Embodiment: Principle of Reduction of Directional Change of Far-Infrared Light With the wavelength of the pump light 115 set to 1064.4 nm, the far-infrared light source 100 of the first embodiment is adapted to change the frequency of the generated far-infrared light 145 in the range of about 0.5 THz to 5 THz by changing the wavelength of the seed light 125 is changed in the range of 1066 nm to 1084 nm and adjusting the incidence angle of the seed light 125 to the nonlinear optical crystal 131 is adjusted by the optical system 121. The following description is made on assumption that the frequency of the far-infrared light 145 is changed in this range.

Figure 3:
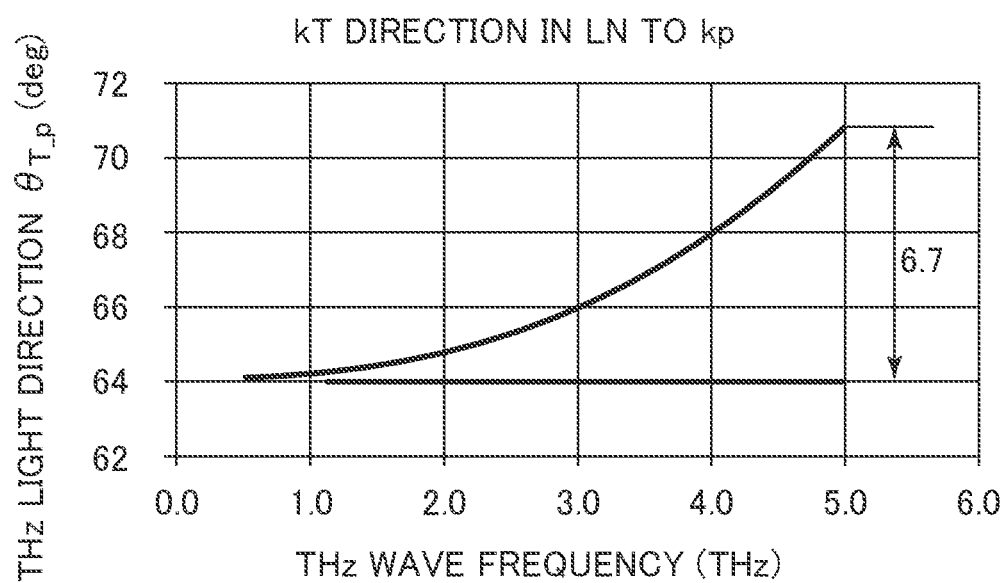
FIG. 3 is a graph showing a relation of an angle $\theta_{T\_p}$ formed by a direction $K_T$ of the far-infrared light 145 with respect to a pump light direction ($k_p$) in a nonlinear optical crystal 131.

FIG. 3 is a graph showing a relation of an angle $\theta_{T\_p}$ formed between a direction $K_T$ of the far-infrared light 145 and a pump light direction ($k_p$) in a nonlinear optical crystal 131. As indicated by the equation 2, the angle $\theta_{T\_p}$ depends upon the frequency of the far-infrared light 145. This example indicates that the emission direction of the far-infrared light 145 varies by 6.7° in conjunction with the change in the frequency of the far-infrared light 145 in the range of 0.5 THz to 5 THz.

In the frequency range shown in FIG. 3, refractive indexes n of the nonlinear optical crystal 131 for the pump light 115 and the seed light 125 at a wavelength λ were calculated using the following equation 3 and according to literature (Zelmon et al. JOSA B Vol. 14, NO. 12, pp. 3319 to 3322). A refractive index $n_{NL}$ of the nonlinear optical crystal 131 for the far-infrared light at a wavelength $\lambda_T$ was calculated using the following equation 4 and according to literature (D. R. Bosomworth et al. Appl. Phys. Lett. No. 9, pp. 330 (1996)).

[Equation 3]
$$n^2 = \frac{2.2454\lambda^2}{\lambda^2 - 0.01242} + \frac{1.3005\lambda^2}{\lambda^2 - 0.05313} + \frac{6.8972\lambda^2}{\lambda^2 - 331.33} + 1 \qquad (3)$$

[Equation 4]
$$n_{NL}^2 = \frac{25.5 \cdot 220^2 - 4.64\left(\frac{10^4}{\lambda_T}\right)^2}{220^2 - \left(\frac{10^4}{\lambda_T}\right)^2} \qquad (4)$$

Figure 4:
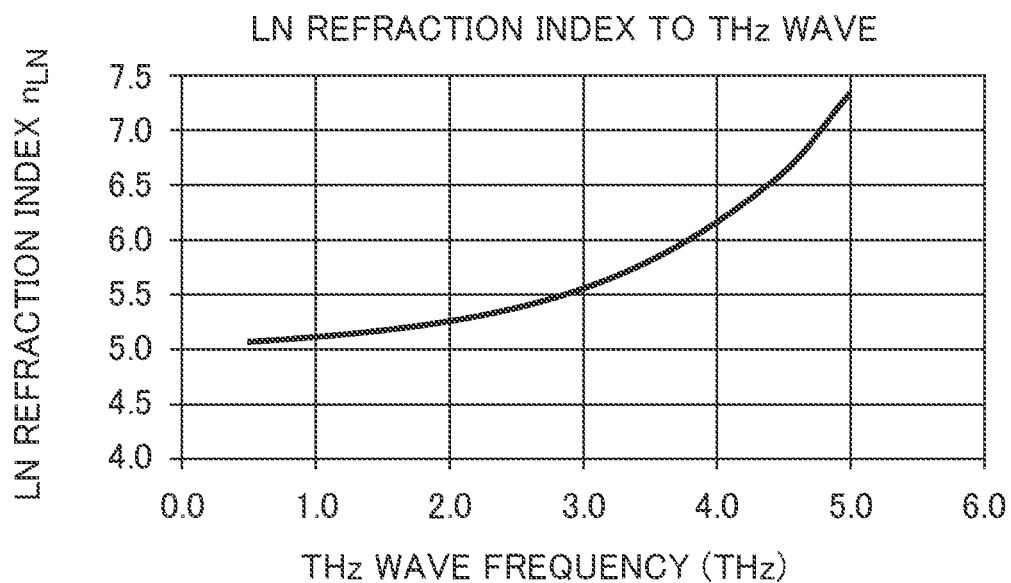
FIG. 4 is a graph showing a relation between the frequency of far-infrared light 145 and refractive index.

FIG. 4 is a graph showing a relation between the frequency of far-infrared light 145 and the refractive index $n_{NL}$. The graph of FIG. 4 represents the calculation results based on the equation 4.

Figure 5:
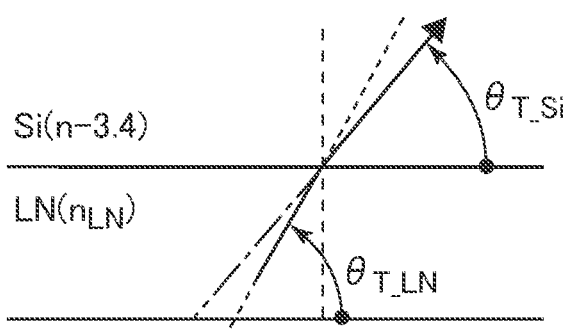
FIG. 5 is a diagram showing refraction of the far-infrared light 145 at an interface between a nonlinear optical crystal 131 and a Si prism 140.

FIG. 5 is a diagram showing refraction of the far-infrared light 145 at an interface between the nonlinear optical crystal 131 and the Si prism 140. The far-infrared light 145 generated in the nonlinear optical crystal 131 is incident on the Si prism 140. In the figure, $\theta_{T\_LN}$ denotes a traveling direction of the far-infrared light 145 in the nonlinear optical crystal 131, while $\theta_{T\_Si}$ denotes a traveling direction of the far-infrared light 145 in the Si prism 140. A refractive angle at the interface is calculated according to Snell's law represented by the following equation 5 using the above refractive index $n_{NL}$ and the refractive index $n_{Si}$ of the Si prism 140 for the far-infrared light wavelength $\lambda_T$.

[Equation 5]
$$n_{Si}\sin\left(\frac{\pi}{2} - \theta_{T\_Si}\right) = n_{NL}\sin\left(\frac{\pi}{2} - \theta_{T\_LN}\right) \qquad (5)$$

Figure 6:
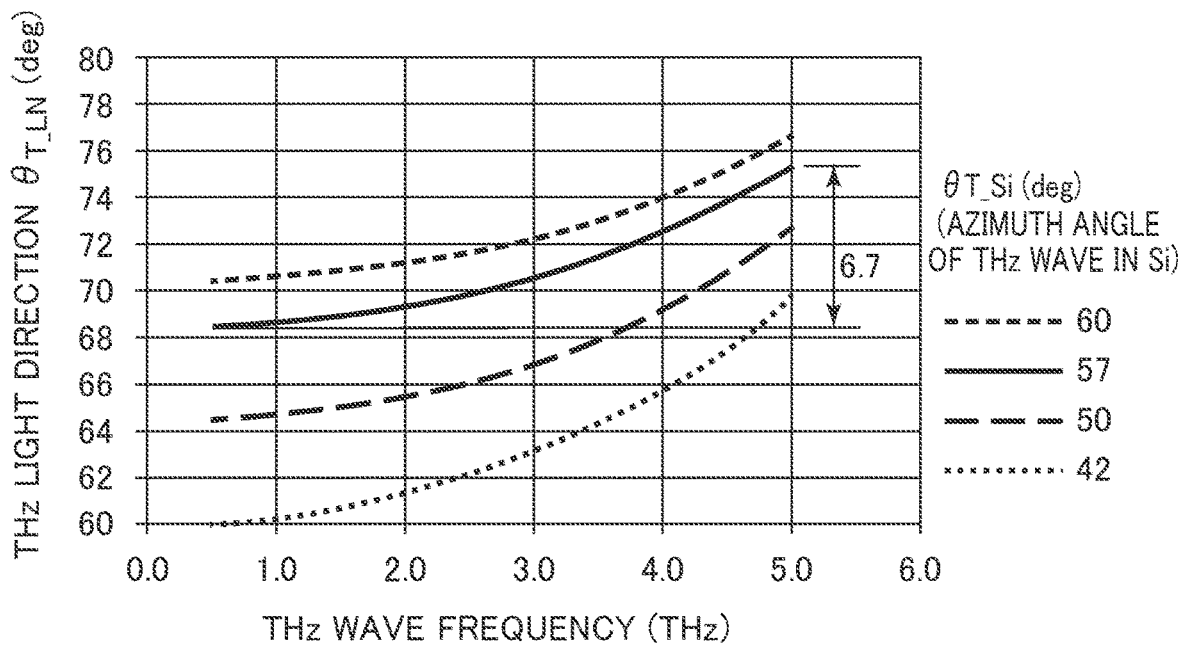
FIG. 6 is a graph showing the results of $\theta_{T\_LN}$ calculation on plural $\theta_{T\_Si}$.

FIG. 6 is a graph showing the results of $\theta_{T\_LN}$ calculation made on plural directions $\theta_{T\_Si}$. In the frequency range of about 0.5 THz to 5 THz of the far-infrared light 145, the wavelength dependency of the Si refractive index is low so that a good approximation by $n_{Si} \approx 4.3$ holds. In this frequency range, therefore, $\theta_{T\_LN}$ for given $\theta_{T\_Si}$ can be calculated by using the equation 4 and the equation 5. In this example, the direction $\theta_{T\_LN}$ was calculated for each of 42°, 50°, 570 and 60° of $\theta_{T\_Si}$.

As shown in FIG. 3 and FIG. 6, $\theta_{T\_p}$ and $\theta_{T\_LN}$ respectively have a specific characteristic to frequency change of the far-infrared light 145. If a condition that substantially equalizes these characteristics with each other can be found, then under such a condition, both the direction $\theta_{T\_p}$ and the direction $\theta_{T\_LN}$ change substantially the same way with the frequency change of the far-infrared light 145. By previously setting a difference between these parameters as $\theta_P$ under such a condition, the angle of the far-infrared light 145 emitted from the Si prism 140 is substantially equalized at all times irrespective of the frequency change of the far-infrared light 145. In the following description, a condition that establishes such a relation is found according to FIG. 3 and FIG. 6.

According to FIG. 6, the variation width of $\theta_{T\_LN}$ with respect to frequency differs according to the value of $\theta_{T\_Si}$. Therefore, it is considered that a $\theta_{T\_Si}$ value that provides a variation width of $\theta_{T\_LN}$ to frequency equal to the variation width of 6.7° as shown in FIG. 3 can be found. Specifically, when a difference of $\theta_{T\_p}$ (6.7° as shown in FIG. 3) at opposite ends of the frequency range of the far-infrared light 145 is equal to a difference of $\theta_{T\_LN}$ at opposite ends of the frequency range of the far-infrared light 145 (a difference between an upper end and a lower end of each curve as shown in FIG. 6), $\theta_{T\_p}$ and $\theta_{T\_LN}$ can be said to have substantially the same change characteristic for the frequency change of the far-infrared light 145. According to the example shown in FIG. 6, when $\theta_{T\_Si}=57°$, both characteristic curve exhibits the variation width of 6.7°. Therefore, it is apparent that this condition is satisfied.

Figure 7:
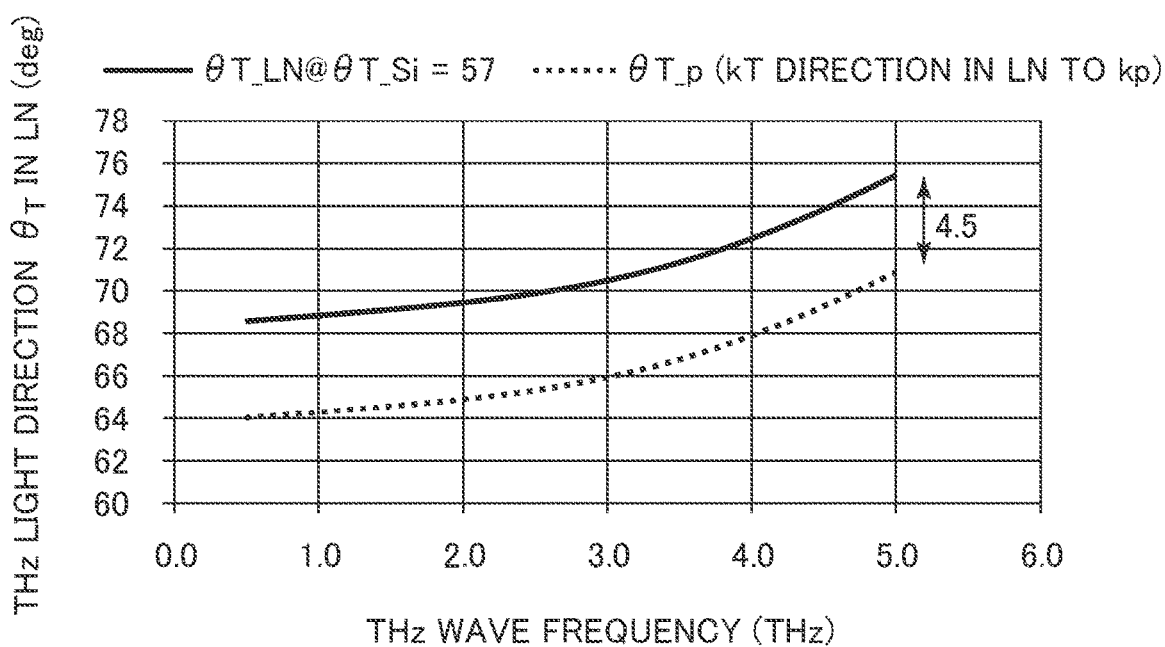
FIG. 7 is a graph showing an example where $\theta_{T\_p}$ and $\theta_{T\_LN}$ have substantially the same change characteristic for frequency.

FIG. 7 shows an example where $\theta_{T\_p}$ and $\theta_{T\_LN}$ have substantially the same change characteristic for frequency. The solid line extracts $\theta_{T\_LN}$ when $\theta_{T\_Si}=570$ from FIG. 6. The dotted line is the characteristic curve shown in FIG. 3. As shown in FIG. 7, when $\theta_{T\_Si}=57°$, both $\theta_{T\_p}$ and $\theta_{T\_LN}$ have substantially the same change characteristic for the frequency of the far-infrared light 145. It is noted, however, that there is a difference of about 4.5° between these parameters. Then, this difference can be offset by setting the angle of the nonlinear optical crystal 131 to $\theta_P=4.5°$. That is, when the frequency of the far-infrared light 145 is changed, $\theta_{T\_Si}$ can be substantially maintained constant.

Figure 8:
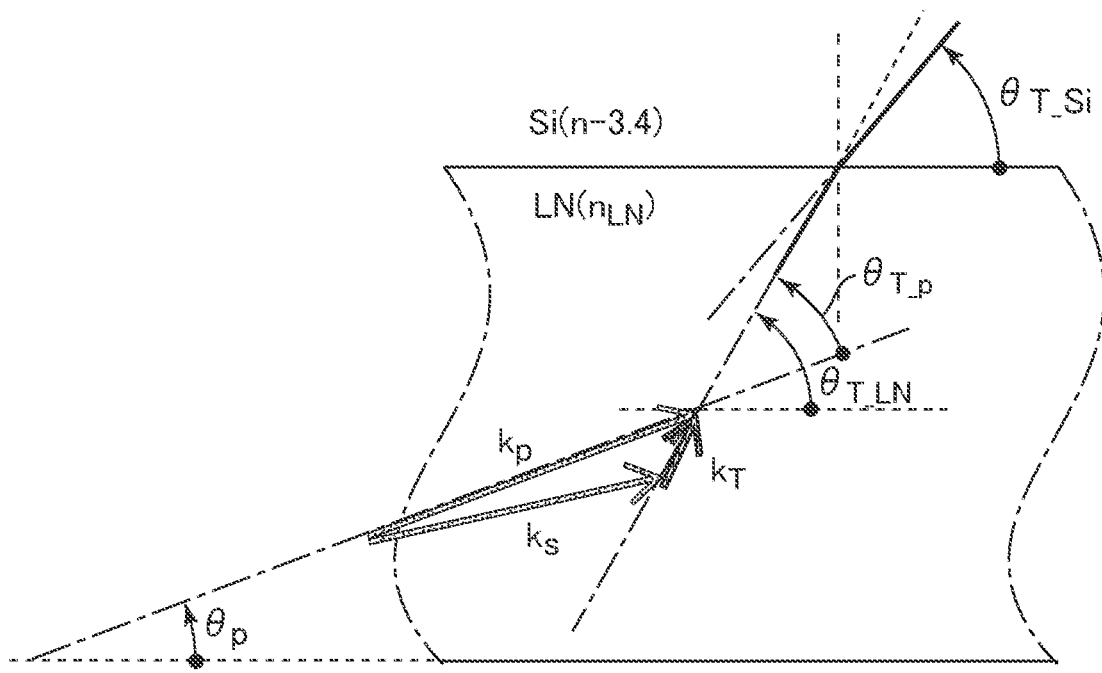
FIG. 8 is a vector diagram showing a relation between $\theta_{T\_p}$ and $\theta_{T\_LN}$.

FIG. 8 is a vector diagram showing a relation between $\theta_{T\_p}$ and $\theta_{T\_LN}$. A difference between $\theta_{T\_p}$ and $\theta_{T\_LN}$ corresponds to 4.5° shown in FIG. 7. When the frequency of the far-infrared light 145 is changed, $\theta_{T\_Si}$ can be substantially maintained constant by conforming Or to this difference.

Figure 9:
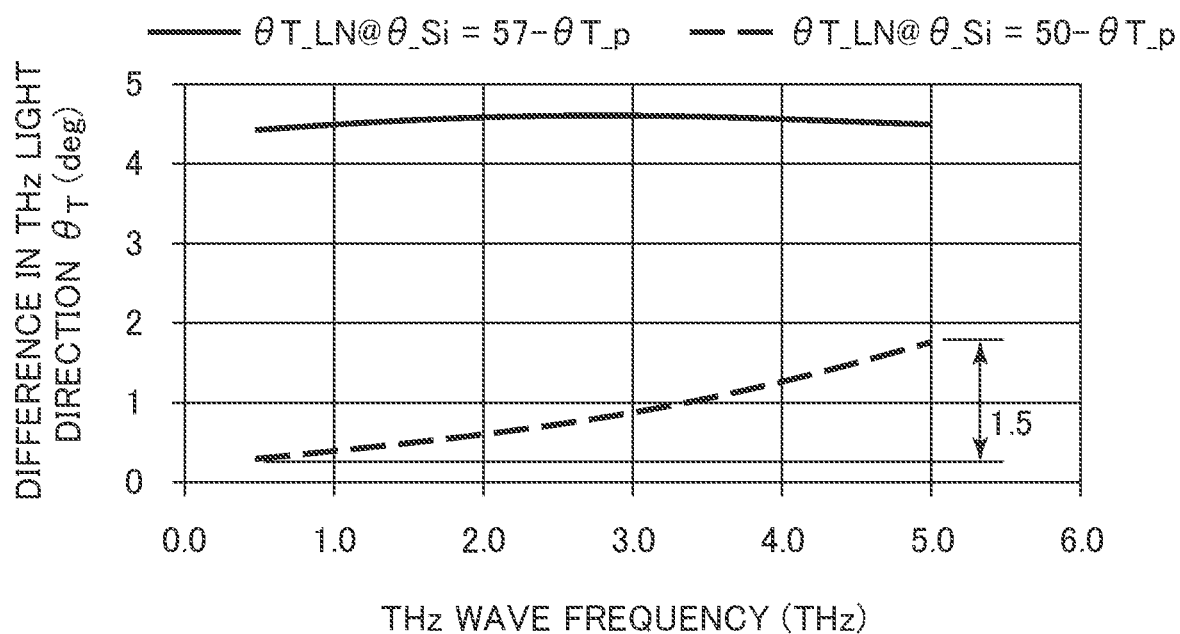
FIG. 9 is a graph showing differences between $\theta_{T\_LN}$ and $\theta_{T\_p}$ when $\theta_{T\_Si}$ is 57° and 50°.

FIG. 9 is a graph showing differences between $\theta_{T\_LN}$ and $\theta_{T\_p}$ when $\theta_{T\_Si}$ is at 570 and at 50°. The graph indicates that the difference in the former case is substantially maintained constant at 4.5° but the difference in the latter case varies by 1.5° with the frequency change.

Figure 10:
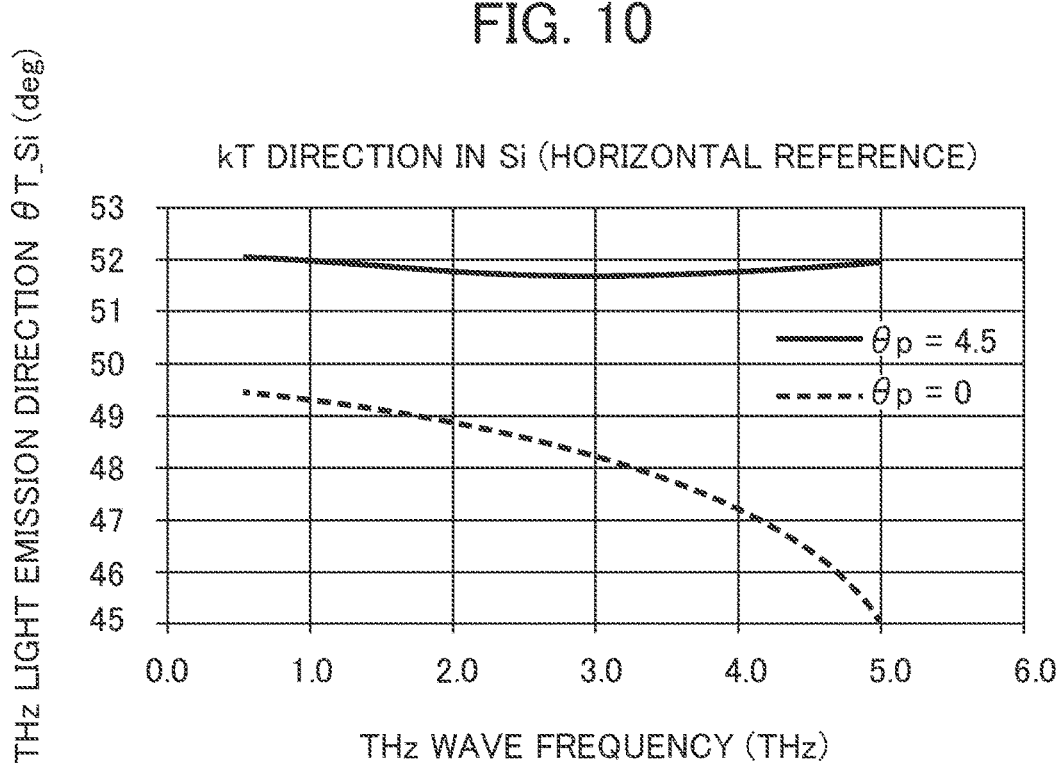
FIG. 10 is a graph showing changes in $\theta_{T\_Si}$ when $\theta_p$ is 4.5° and 0°.

FIG. 10 is a graph showing changes of $\theta_{T\_Si}$ when $\theta_p$ is 4.5° and 0°. When the conditions explained with reference to FIG. 7 and FIG. 8 are satisfied, $\theta_{T\_Si}$ can be substantially maintained constant against the frequency change of the far-infrared light 145 (A variation width is less the 0.3°.) by setting $\theta_P=4.5°$. In a conventional case of $\theta_P=0°$, on the other hand, the emission direction of the far-infrared light 145 changes by 5° or so because $\theta_{T\_Si} \approx 50°$ in vicinity of 0.5 THz and $\theta_{T\_Si} \approx 45°$ in vicinity of 5.0 THz. This angular change is further expanded when the light is emitted into the air from the Si prism 140. Heretofore, this phenomenon has been the cause of extremely difficult optical system design of the far-infrared spectrometers. The invention is advantageous from the viewpoint of optical system design because the invention is adapted to reduce this angular change.

First Embodiment: Summary

The first embodiment is configured to previously determine such a $\theta_{T\_Si}$ (emission direction of the far-infrared light 145) as to ensure that both $\theta_{T\_p}$ (the angle of the far-infrared light 145 to the pump light 115) and $\theta_{T\_LN}$ (the angle of the far-infrared light 145 to the interface between the nonlinear optical crystal 131 and the Si prism 140) substantially equally change when the wavelength of the far-infrared light 145 is changed. The rotary stage 138 has the difference between $\theta_{T\_p}$ and $\theta_{T\_LN}$ as Op (the incidence angle of the pump light 115 to the nonlinear optical crystal 131). Thus, the far-infrared light 145 can be emitted into the air substantially at constant angle.

Second Embodiment

Figure 11:
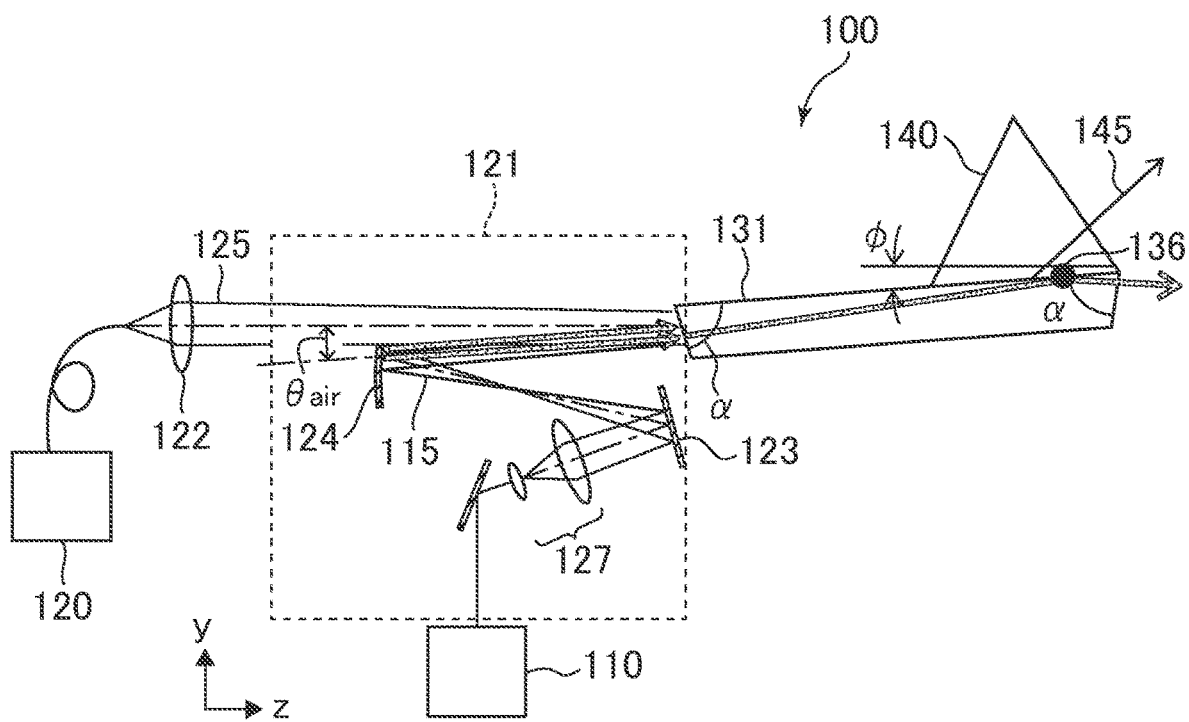
FIG. 11 is a configuration diagram showing a far-infrared light source 100 according to a second embodiment of the invention.

FIG. 11 is a configuration diagram showing a far-infrared light source 100 according to a second embodiment of the invention. The second embodiment differs from the first embodiment in that the incidence angle of the seed light 125 is fixed while the incidence angle of the pump light 115 is variable by means of the optical system 121. The other components are the same as those of the first embodiment and hence, the following description is principally made on differences.

A lens system 127 is employed in the optical system 121 in place of the lens 122. The lens system 127 expands the pump light 125 before making the light incident on the light deflector 123. In the second embodiment, the wavelength of the far-infrared light 145 is changed by adjusting the incidence angle of the pump light 115 in a manner to satisfy the equation 1 and the equation 2 according to the change in the wavelength of the seed light 125. The second embodiment is also adapted to maintain the emission direction of the far-infrared light substantially constant by changing the angle of the nonlinear optical crystal 131 to the pump light 115 just as in the first embodiment.

Figure 12:
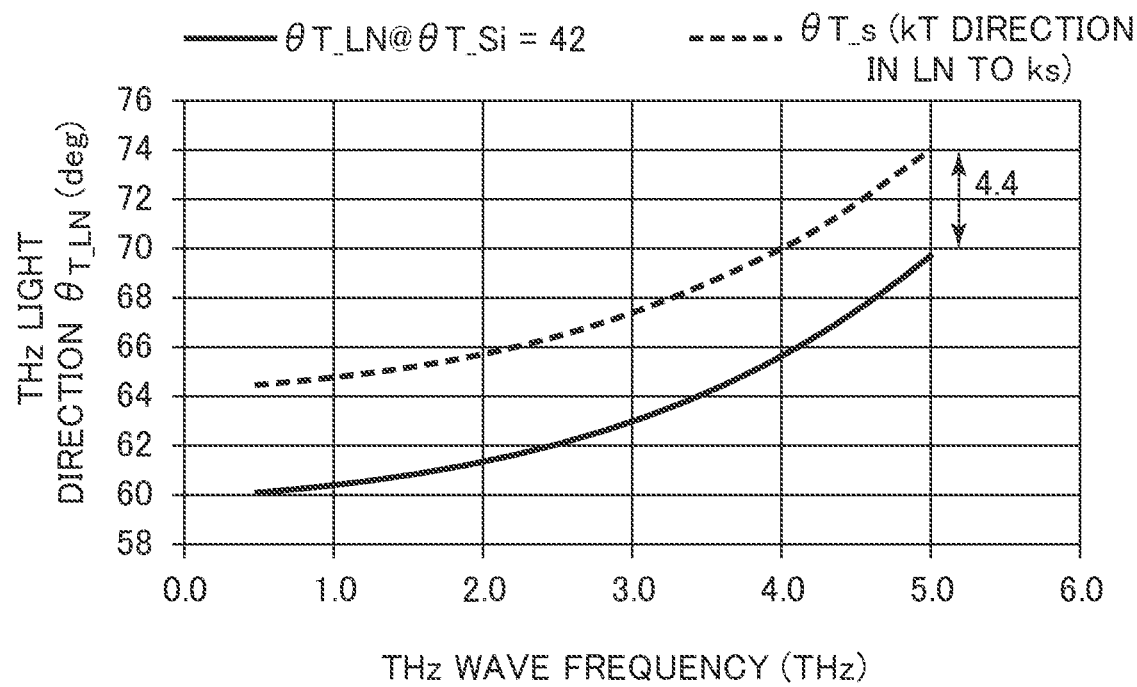
FIG. 12 is a graph showing an example where both a direction $\theta_{T\_s}$ of the far-infrared light 145 in the nonlinear optical crystal 131 with respect to a direction $\theta_S$ of the seed light 125, and the direction $\theta_{T\_LN}$ have substantially the same change characteristic for frequency.

FIG. 12 is a graph showing an example where both the direction $\theta_{T\_s}$ of the far-infrared light 145 in the nonlinear optical crystal 131 with respect to the direction $\theta_S$ of the seed light 125, and the direction $\theta_{T\_LN}$ have substantially the same change characteristic for frequency. In the second embodiment, these directions have substantially the same change characteristic when $\theta_{T\_Si}=42°$, and exhibit constant angular difference of about 4.4° in the wavelength range of 0.5 to 5.0 THz. In spite of changing the frequency of the far-infrared light 145, therefore, the embodiment can maintain $\theta_{T\_Si}=42°$ by setting the angle $\theta_S$ of the nonlinear optical crystal 131 to the seed light 125 to 4.4°.

Figure 13:
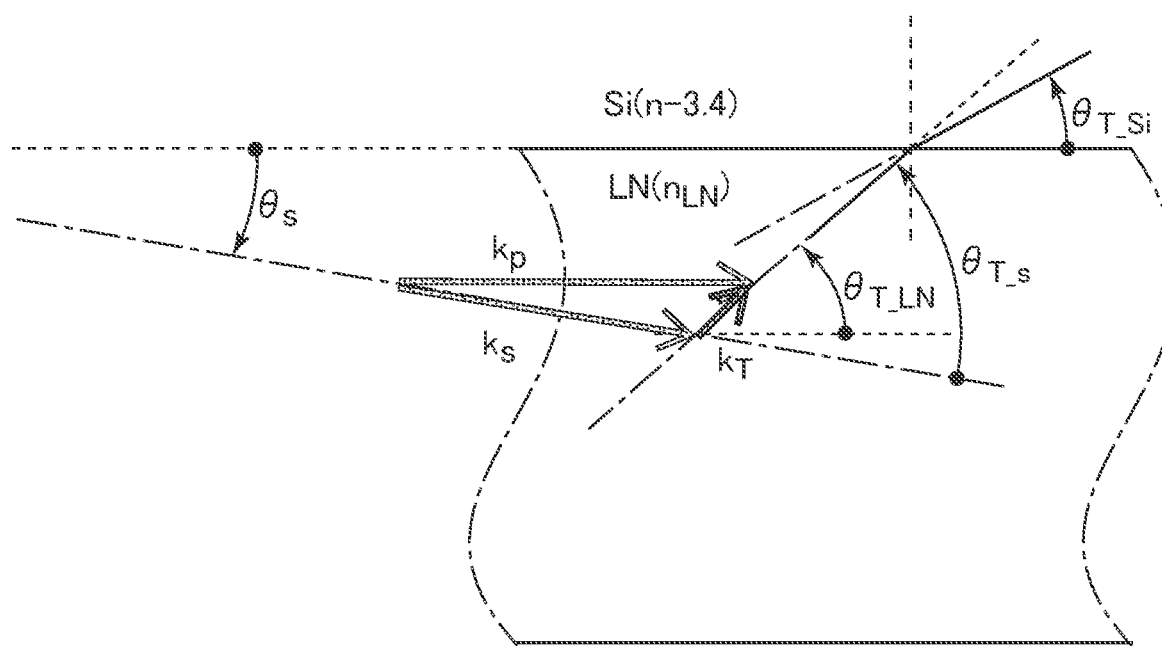
FIG. 13 is a vector diagram showing a relation between $\theta_{T\_s}$ and $\theta_{T\_LN}$.

FIG. 13 is a vector diagram showing a relation between $\theta_{T\_s}$ and $\theta_{T\_LN}$. In the second embodiment, the incidence angle of the seed light 125 is fixed. For convenience of explanation, therefore, the traveling direction of each light is expressed by way of the relation between $\theta_{T\_s}$ and $\theta_{T\_LN}$. However, the fact also remains in the second embodiment that the difference still exists between $\theta_{T\_p}$ and $\theta_{T\_LN}$. Hence, it is noted that the notation in FIG. 13 is for convenience in description.

In the second embodiment, as well, it is important to incline the entering surface and the exiting surface of the nonlinear optical crystal 131 at an angle α (on the order of 80 to 89°) to the side plane thereof. This is effective to prevent the pump light 115 specularly reflected by the entering surface or exiting surface of the nonlinear optical crystal 131 from being incident on the optical system of the seed light 125.

Third Embodiment

Figure 14:
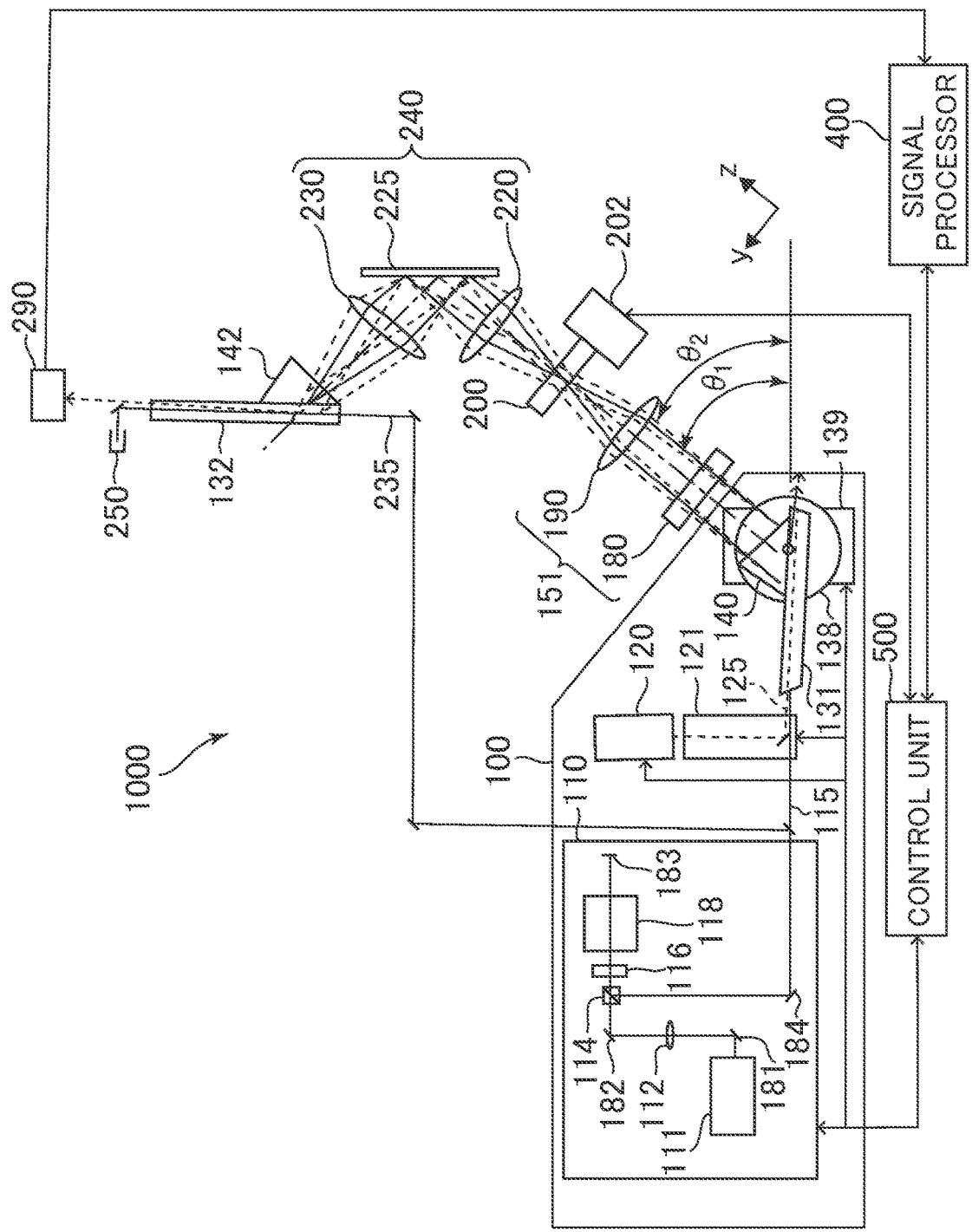
FIG. 14 is a configuration diagram showing a far-infrared spectrometer 1000 according to a third embodiment of the invention.

FIG. 14 is a configuration diagram showing a far-infrared spectrometer 1000 according to a third embodiment of the invention. The far-infrared spectrometer 1000 is an apparatus for measuring an absorption spectrum of a sample 200 by using light through the sample 200, for example.

The far-infrared spectrometer 1000 includes: a far-infrared light source 100; an illumination optical system 151; a stage 202; a far-infrared light imaging optical system 240; a nonlinear optical crystal 132; a photoelectric detector 290; a signal processor 400; and a control unit 500. The illumination optical system 151 illuminates the sample 200 with the far-infrared light emitted from the far-infrared light source 100. The stage 202 carries the sample 200 thereon. The far-infrared light imaging optical system 240 images the far-infrared light transmitted through the sample 200 on the nonlinear optical crystal 132. The nonlinear optical crystal 132 converts the far-infrared light transmitted through the sample 200 to a near-infrared light by using a pump light 235.

The far-infrared light source 100 includes the components described in the first embodiment. The light source 110 includes as principal components: (a) a short pulse Q-switch YAG laser 111; (b) a polarization separation system including a polarization beam splitter (hereinafter, referred to as PBS) 114 and a quarter-wave plate 116; and (c) an amplifier unit (solid-state amplifier 118) for amplifying a laser output. An output beam from the YAG laser 111 is collimated by a lens 112, subjected to the polarization separation system and amplified by a solid-state amplifier 118. The beam passed through the PBS 114 is amplified by means of the quarter-wave plate 116 and the solid-state amplifier 118 and is reflected by a mirror 183. The reflected beam is amplified again by the solid-state amplifier 118 and is incident on the PBS 114 via the quarter-wave plate 116. Subsequently, the beam is emitted as a pump light 115 via the PBs 114 and a mirror 184. The output from the from the YAG laser 111 is amplified by the use of the solid-state amplifier 118 so that a powerful far-infrared light having a peak power on the order of kilowatts can be extracted from the nonlinear optical crystal 131.

The nonlinear optical crystal 131 has its entering surface and exiting surface processed to form an angle α=840 to the side plane, for example. An angle φ of the rotary stage 138 is so set as to provide orientation of the pump light 115 in the nonlinear optical crystal 131 (angle to the crystal side plane) $\theta_P$=4.5. In the third embodiment, the angle is defined as φ=3.9°. Thus, the embodiment is adapted to allow the reflected pump light 115 from the surface of the nonlinear optical crystal 131 to exit downward with respect to the drawing surface of FIG. 14, while satisfying $\theta_P$=4.5°. The position of the linear stage 139 is set such that the pump light 115 is reflected by the side plane of the nonlinear optical crystal 131 at a location slightly toward the entering side from the exiting surface of the nonlinear optical crystal 131.

The illumination optical system 151 can be constituted by, for example, one cylindrical lens 180 and one condenser lens 190. The far-infrared light generated in the nonlinear optical crystal 131 is emitted from a linear light emission region along the beam of the pump light 115, forming parallel rays as seen in a drawing surface of FIG. 14 or a spread beam as seen in a plane vertical to the drawing surface. Hence, the cylindrical lens 180 having an optical power only in an in-plane direction vertical to the drawing surface is used for collimating the beam in the in-plane direction vertical to the drawing surface. Thus, a parallel pencil is formed. The parallel pencil is focused onto the sample 200 by the condenser lens 190 so that a spot on the sample 200 is irradiated with the light.

The far-infrared light transmitted through the sample 200 is guided by the far-infrared light imaging optical system 240 to the nonlinear optical crystal 132 via a Si prism 142. The far-infrared light imaging optical system 240 is constituted by two condenser lenses 220, 230 and one mirror 225, serving as an imaging optical system for forming an image of a surface of the sample 200 in the nonlinear optical crystal 132. Specifically, the far-infrared light transmitted through the sample 200 is collimated by the condenser lens 220, reflected by the mirror 225, and focused in the nonlinear optical crystal 132 by the condenser lens 230 via the Si prism 142. The incidence angle formed by the far-infrared light through the sample 200 to the nonlinear optical crystal 132 in the Si prism 42 is optimized similarly to the angle $\theta_P$ of the nonlinear optical crystal 131 to the pump light 115. Specifically, the far-infrared light is made to travel through the nonlinear optical crystal 132 substantially at a constant angle irrespective of the change in the wavelength of the far-infrared light.

The pump light 235 split from the beam of the pump light 115 is made incident on the nonlinear optical crystal 132. Thus, the far-infrared light transmitted through the sample 200 and guided by the nonlinear optical crystal 132 can be converted again to the near-infrared light having a wavelength in vicinity of the range from 1066 nm to 1084 nm. The photoelectric detector 290 photoelectrically converts the generated near-infrared light so as to output the conversion result as a detection signal. A far-infrared absorption spectrum of the sample 200 can be obtained by recording the detection signals while scanning the wavelength of the generated far-infrared light. The photoelectric detector 290 may be a photosensitive device (1D array detector) including plural photosensitive elements arranged in 1D array or a photosensitive device (2D array detector) including plural photosensitive elements arranged in 2D array. The 1D array detector and 2D array detector for near-infrared light are relatively easy to acquire, features quick response and operates at normal temperatures. Therefore, these detectors are suitable for industrial applications.

The pump light 235 is made incident on the nonlinear optical crystal 132 in synchronism with the incidence of pulses of the far-infrared light transmitted through the sample 200. To ensure the synchronized timings, a delay optical system (such as delay optical length correction stage), a half wave plate for adjustment of polarization direction or the like can be disposed on the optical path of the pump light 235, as needed. In this configuration, a beam with well-organized time profile can be used as the pump light 235. This results in enhanced wavelength conversion efficiency and detection sensitivity.

In case where the output power of the light source 110 is not sufficient, the pump light transmitted through the nonlinear optical crystal 131 may be guided to the nonlinear optical crystal 132 for reuse. In this case, the detection efficiency decreases because of the degraded beam quality of the pump light 235. However, the configuration provides efficient use of the pump light 115 for double purposes of generating the far-infrared light and for wavelength conversion to that of near-infrared light.

The signal processor 400 retrieves a detection signal outputted from the photoelectric detector 290. The signal processor 400 generates a distribution image of signals proportional to light transmitted through the sample 200 on the basis of the position of the stage 202 at the time of signal retrieval. The signal processor 400 is also capable of calculating the absorption spectrum by comparing the acquired image data and reference data (spectral image data without a sample) stored in a storage region of the signal processor 400, so as to acquire two-dimensional distribution of absorption spectrum (absorption spectral image).

The control unit 500 controls the whole system. For instance, the control unit 500 controls the far-infrared light source 100, the stage 202 and the signal processor 400. As for the far-infrared light source 100, the control unit controls the light source 110, the optical system 121, the rotary stage 138, and the linear stage 139. The control unit 500 also provides a user interface. For example, the control unit 500 may also include a display part for displaying the signal and data (spectroscopic information) acquired by the signal processor 400. In a case where data on the sample 200 is acquired with fixed frequency, the control unit 500 controls the far-infrared light source 100 so as to generate a specified far-infrared light and synchronizes the transfer of the stage 202 with data acquisition by the photoelectric detector 290.

The far-infrared spectrometer 1000 according to the embodiment optimizes the orientation $\theta_P$ of the pump light 115 in the nonlinear optical crystal 131, so as to reduce the change in the emission direction of the far-infrared light to about $1.0°$ in the total angular range ($\theta1$ to $\theta2$) in the air even though the frequency of the far-infrared light is changed in a broad range of 0.5 to 5 THz. This provides sufficient reduction of change in the irradiation position on the sample 200, too. Specifically, in a case where a lens having a focal length of 50 mm is used as the condenser lens 190, the change in the irradiation position on the sample 200 is on the order of ±0.5 mm. This value is negligible in practical use in a case where an irradiation spot size on the sample 200 exceeds 1 mm. In a case where more accurate measurement is required, this deviation can be corrected by transferring the stage 202 in the y-direction.

While the third embodiment illustrates the example where the short pulse Q-switch YAG laser 111 is used as the light source 110, the invention is not limited to this. What is required is a narrow spectral line width and hence, a mode-locked laser, for example, may be used as the light source 110. The mode-locked laser provides faster measurement because of fast repetition operation. It goes without saying that the far-infrared light source 100 described in the second embodiment is also usable in the third embodiment.

Fourth Embodiment

Figure 15:
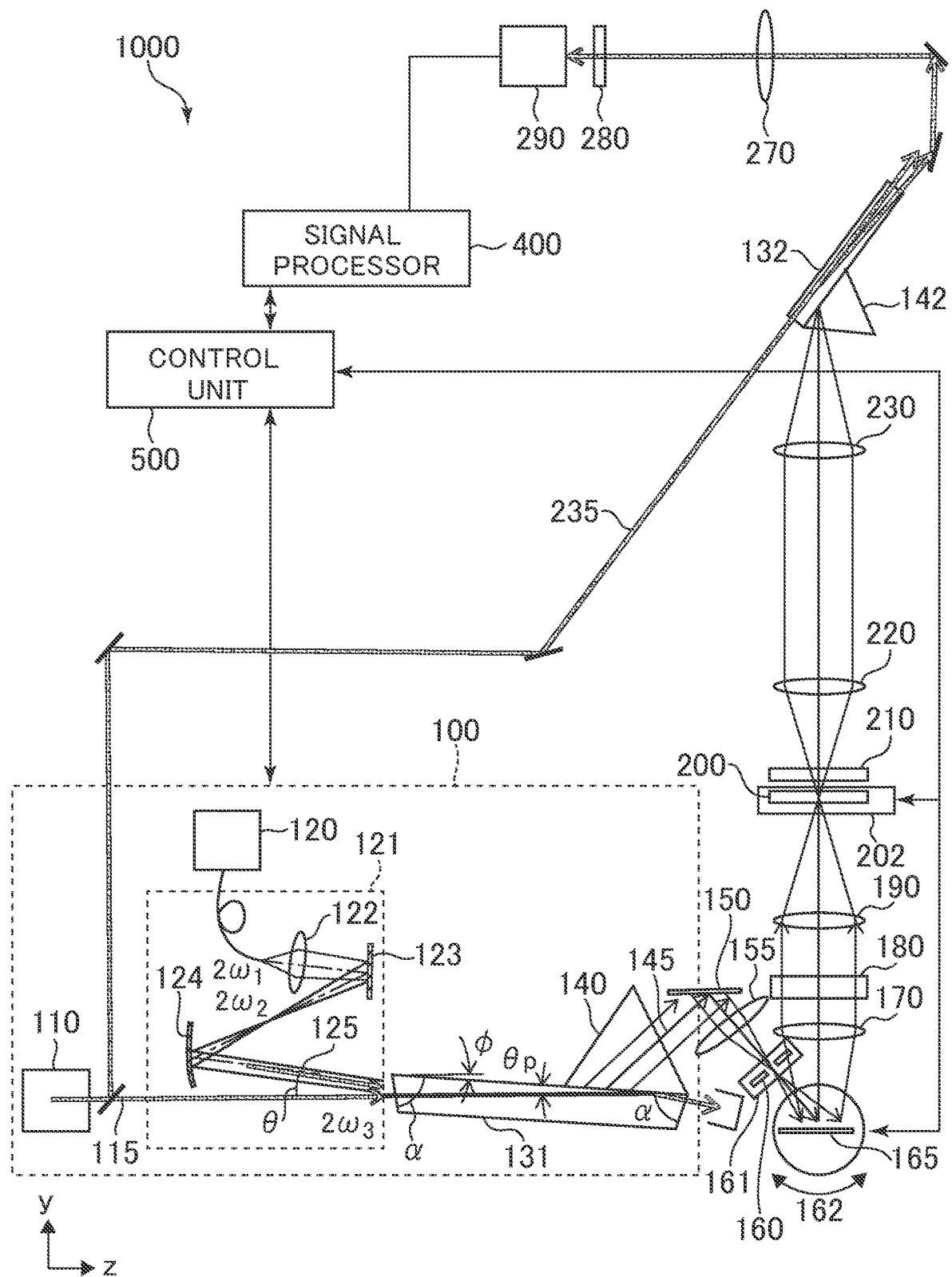
FIG. 15 is a configuration diagram showing a far-infrared spectrometer 1000 according to a fourth embodiment of the invention.

FIG. 15 is a configuration diagram showing a far-infrared spectrometer 1000 according to a fourth embodiment of the invention. The fourth embodiment differs from the third embodiment in the configurations of the optical systems subsequent to the far-infrared light source 100. The other components are the same as those of the third embodiment and hence, the following description is principally made on differences.

An illumination optical system (150 to 190) for irradiating the sample 200 with the far-infrared light includes: for example, three cylindrical lenses 155, 170, 180; a slit 160; an angle variable mirror 165; and a condenser lens 190.

In the drawing surface of FIG. 15, the two cylindrical lenses 155 and 170 have an optical power in a drawing surface of FIG. 15. The cylindrical lens 155 is so set as to image the far-infrared light emitted from the nonlinear optical crystal 131 in vicinity of a reflection plane of the angle variable mirror 165. The far-infrared light emitted from the nonlinear optical crystal 131 is changed in the emission direction on the order of one to several degrees in the drawing surface of FIG. 15 depending upon the frequency. However, the far-infrared light is not changed in the incident position on the reflection plane of the angle variable mirror 165. The angle of the angle variable mirror 165 is adjusted such that the far-infrared light reflected by the angle variable mirror 165 invariably travels in the y-direction in FIG. 1. Thus, the far-infrared light reflected by the angle variable mirror 165 is made to follow the same optical path irrespective of the frequency. The cylindrical lens 170 forms the parallel pencil in the drawing surface of FIG. 1 by collimating the far-infrared light reflected by the angle variable mirror 165.

The slit 160 mounted on a linear stage 161 is disposed in vicinity of a back focal plane of the cylindrical lens 155. Scanning the frequency of the far-infrared light changes the direction of the far-infrared light 145. This is followed by the change in a focusing position to the slit 160. The linear stage 161 transfers the slit 160 in a manner to follow the change in the focusing position. Thus, far-infrared light components generated in the nonlinear optical crystal 131 but unnecessary for measurement (background light covering a broad band, referred to as "TPG light") can be reduced by blocking. This results in improved SN ratio of spectral measurement across a broad frequency band.

In a direction vertical to the drawing surface, divergent beams emitted from the Si prism 140 are collimated by the cylindrical lens 180. Just as in an in-plane direction of the drawing, the condenser lens 190 applies the collimated light onto the spot on the sample 200.

A far-infrared light imaging optical system (210 to 230) includes a diffuser 210 in addition to the condenser lenses 220, 230. In a case where the sample 200 has high transmittance for the far-infrared light, scattering less light, the far-infrared light incident on the nonlinear optical crystal 132 may be superimposed with a coarse speckle pattern. As the result, a minor positional shift of the sample 200 may result in a significant change in the detection signal. The speckle pattern can be made very small by sufficiently diffusing the far-infrared light by means of multiple scattering in the diffuser 210. Thus, contrast can be reduced, resulting in an enhanced stability of the detection signal. Alternatively, the variations of the detection signal may also be reduced by time-integrating the detection signals by rotating the diffuser 210 to move the speckle pattern.

The far-infrared light is converted again to the near-infrared light having the wavelength in vicinity of the range from 1066 nm to 1084 nm by making the pump light 235 incident on the nonlinear optical crystal 132. The near-infrared light is detected by the photoelectric detector 290 via a lens 270 and a ND (neutral density) filter 280.

Fourth Embodiment: Summary

Just as the first to third embodiments, the far-infrared spectrometer 1000 according to the fourth embodiment of the invention is adapted to reduce the directional change of the far-infrared light 145 emitted from the far-infrared light source 100. Furthermore, the far-infrared spectrometer 1000 according to the fourth embodiment is configured to guide the far-infrared light 145 to the angle variable mirror 165, which cancels the directional variation of the far-infrared light 145. This configuration can reduce the shift of the irradiation position of the far-infrared light due to the frequency change without using an optical system having a large aperture. Therefore, the broadband spectroscopic measurement can be accomplished by a compact optical system. Further, the invention can enhance the accuracy of quantitative analysis by obviating component distribution variations, change in signal detection efficiency and the like.

<Modifications of Invention>

The invention is not limited to the above-described embodiments but includes a variety of modifications. The foregoing embodiments, for example, are the detailed illustrations to clarify the invention. The invention is not necessarily limited to those including all the components described above. Some component of one embodiment can be replaced by some component of another embodiment. Further, some component of one embodiment can be added to the arrangement of another embodiment. A part of the arrangement of each embodiment permits addition of some component of another embodiment, the omission thereof or replacement thereof.

The above embodiments are applicable to analysis of contents of chemical components in samples, or to sample analysis by the use of light in a far-infrared region in test processes such as of exotic component or foreign matter. The light in the far-infrared region according to the above embodiments is light having wavelength ranging from 25 µm to 4 mm, for example. While a variety of numerical ranges of wavelength are known as the definition of the "far-infrared region", the light in the far-infrared region in the above embodiments should be construed as the light having the widest range of the ranges defined in all areas. The term "terahertz wave" is included in the above-described far-infrared region.

In the above embodiments, even under the conventionally used condition $\theta_p \approx 0°$, the difference between $\theta_{T\_LN}$ and $\theta_{T\_P}$ may be corrected by means of the rotary stage 138. Specifically, $\theta_p$ may be changed by rotating the stage according to the change in the wavelength of the far-infrared light. This is effective to reduce in some degree the change in the emission direction of the far-infrared light in the Si prism 140.

In the above embodiments, the signal processor 400 and the control unit 500 can be implemented by using hardware such as circuit devices mounting these functions, or otherwise implemented by program codes of software implementing these functions. In this case, a storage medium recording the program codes is provided such that an arithmetic device such as CPU (Central Processing Unit) can run the program by retrieving the program codes stored in the storage medium. In this case, the program codes retrieved from the storage medium per se implement the functions of the embodiment while the program codes per se and the storage medium recording the program codes constitute the invention. Examples of usable recording medium providing such program codes include flexible disk, CD-ROM, DVD-ROM, hard disk, optical disk, magnetic optical disk, CD-R, magnetic tape, non-volatile memory card, ROM and the like.

The processes and techniques described herein can be also implemented by suitable combinations of components. Further, a variety of general-purpose devices are usable. In some cases, it is useful to build a dedicated device for performing the processes described herein. That is, a part of the above-described signal processor 400 and control unit 500 may be implemented by hardware employing electronic components such as an integrated circuit.

The foregoing embodiments illustrate only some control lines and information lines that are considered necessary for explanatory purpose but not necessarily illustrate all the control lines and information lines of the product. All the configurations may be interconnected.

LIST OF REFERENCE SIGNS

100: far-infrared light source
110: light source
111: YAG laser
112: lens
114: polarizing beam splitter
115: pump light
116: quarter-wave plate
118: solid-state amplifier (amplifier unit)
120: light source
121: optical system
122, 270: lens
123: light deflector
124: imaging optical element
125: seed light
130, 131, 132: nonlinear optical crystal
140, 142: Si prism
155, 170, 180: cylindrical lens
190, 220, 230: condenser lens
151: illumination optical system
160: slit
161, 139: linear stage
162, 138: rotary stage
165: angle variable mirror
240: far-infrared light imaging optical system
200: sample
202: stage
210: diffuser
280: ND filter
290: photoelectric detector

The invention claimed is:

1. A far-infrared light source with variable frequency, comprising:
   a first light source emitting a first laser light being a pulse laser;
   a second light source emitting a second laser light and capable of changing a wavelength of the second laser light;
   a nonlinear optical crystal generating, by permitting incidence of the first laser light and the second laser light, a far-infrared light in a propagating direction that varies depending on frequency; and
   a prism attached to a side plane of the nonlinear optical crystal and receiving and emitting the far-infrared light generated by the nonlinear optical crystal;
   wherein the far-infrared light is emitted from the nonlinear optical crystal into the prism based on a dispersion characteristic of the nonlinear optical crystal, and
   wherein the far-infrared light source is configured to select and configure an emitting angle of the far-infrared light in the prism such that a frequency dependency of a propagating direction of the far-infrared light generated in the nonlinear optical crystal is canceled.

2. The far-infrared light source according to claim 1, wherein the far-infrared light source changes a frequency of the far-infrared light in a range between approximately 0.5 THz and at least 3 THz to 5 THz, wherein an incident angle of the first laser light into the nonlinear optical crystal is constant, and wherein the far-infrared light source is configured to vary an incident angle of the second laser light into the nonlinear optical crystal depending on a wavelength of the second laser light.

3. The far-infrared light source according to claim 2, wherein the far-infrared light source is configured to configure an angle of the nonlinear optical crystal with respect to a propagating angle of the first laser light such that an emitting angle of the far-infrared light into the prism is at a predetermined value.

4. The far-infrared light source according to claim 1, wherein an incident angle of the second laser light into the nonlinear optical crystal is constant, and wherein the far-infrared light source is configured to vary, depending on a wavelength of the second laser light, an incident angle of the first laser light into the nonlinear optical crystal.

5. The far-infrared light source according to claim 4, wherein the far-infrared light source is configured to configure an angle of the nonlinear optical crystal with respect to a propagating angle of the second laser light such that an emitting angle of the far-infrared light in the prism is at a predetermined value.

6. The far-infrared light source according to claim 1, further comprising an optical system for adjusting an incidence angle at which the second laser light is incident on an entering surface of the nonlinear optical crystal, wherein the entering surface is inclined to avoid the first laser light reflected by the entering surface from returning to the optical system, and an exiting surface of the nonlinear optical crystal for the first laser light is inclined to avoid the first laser light reflected by the exiting surface from returning to the optical system.

7. The far-infrared light source according to claim 6, wherein the optical system comprises:

a light deflector for deflecting the second laser light; and an imaging optical element for imaging a deflecting surface of the light deflector on the entering surface.

8. The far-infrared light source according to claim 1, further comprising an optical system for irradiating an entering surface of the nonlinear optical crystal with the second laser light, wherein the entering surface is inclined to avoid the first laser light reflected by the entering surface from returning to the optical system, and an exiting surface of the nonlinear optical crystal for the first laser light is inclined to avoid the first laser light reflected by the exiting surface from returning to the optical system.

9. A far-infrared spectrometer comprising:

the far-infrared light source according to claim 1;

an illumination optical system for irradiating a sample with the far-infrared light emitted from the far-infrared light source;

a far-infrared light imaging optical system for imaging the far-infrared light transmitted through the sample or reflected by the sample; and a second nonlinear optical crystal for converting the far-infrared light imaged by the far-infrared imaging optical system to a near-infrared light.

10. The far-infrared spectrometer according to claim 9, the far-infrared light source is configured so that an emission angle of the far-infrared light is changed when its frequency is changed, and the illumination optical system corrects an irradiation position of far-infrared light on sample when the angle of the far-infrared light emitted from the far-infrared light source is changed.

11. The far-infrared spectrometer according to claim 10, wherein the illumination optical system comprises an angle variable mirror capable of adjusting the angle of a reflection plane to reflect the far-infrared light, and the angle variable mirror corrects the irradiation position of the far-infrared light on the sample by adjusting the angle of a reflection plane reflecting the far-infrared light.

12. The far-infrared spectrometer according to claim 11, wherein the illumination optical system comprises:

a cylindrical lens for collecting the far-infrared light emitted from the far-infrared light source; and a slit disposed in vicinity of a back focal plane of the cylindrical lens and blocking some of the frequency components of the far-infrared light that is not needed to be applied onto the sample.

13. The far-infrared spectrometer according to claim 9, wherein the far-infrared light imaging optical system comprises a diffuser between the sample and the second nonlinear optical crystal.

14. The far-infrared spectrometer according to claim 13, further comprising a mechanism that rotates the diffuser.

15. The far-infrared spectrometer according to claim 13, further comprising a signal processor that performs time integration of signals detected by rotating the diffuser.

* * * * *